United States Patent [19]
Kieserling et al.

[11] Patent Number: 5,358,410
[45] Date of Patent: Oct. 25, 1994

[54] CASING FOR A SPIRAL CABLE

[75] Inventors: Joachim Kieserling, Kernen im Remstal; Manfred Link, Waiblingen; Andreas Franke, Stuttgart, all of Fed. Rep. of Germany

[73] Assignee: Mercedes-Benz AG, Stuttgart, Fed. Rep. of Germany

[21] Appl. No.: 135,353

[22] Filed: Oct. 13, 1993

[30] Foreign Application Priority Data

Oct. 17, 1992 [DE]  Fed. Rep. of Germany ....... 4235055

[51] Int. Cl.$^5$ .............................................. H01R 35/04
[52] U.S. Cl. ........................................ 439/164; 439/15
[58] Field of Search ................................... 439/15, 164

[56] References Cited

U.S. PATENT DOCUMENTS

| | | | |
|---|---|---|---|
| 4,744,763 | 5/1988 | Suzuki et al. | 439/164 |
| 4,943,240 | 7/1990 | Karlsson | 439/15 |
| 5,046,951 | 9/1991 | Suzuki | 439/164 |
| 5,061,195 | 10/1991 | Bolen | 439/164 |
| 5,256,075 | 10/1993 | Miyahara et al. | 439/164 |

FOREIGN PATENT DOCUMENTS

0417350A1  10/1989  European Pat. Off. .

*Primary Examiner*—Gary F. Paumen
*Attorney, Agent, or Firm*—Evenson, McKeown, Edwards & Lenahan

[57] ABSTRACT

According, two casing parts is disclosed for a spiral cable for connecting electrical line terminals between a stationary vehicle steering column and a rotatable steering wheel. One of the two casing parts has an annular space for the spiral cable which is open towards an axial face and the other casing part is in the form of a plate for covering the annular space. It is thus possible to arrange the two casing parts at an axial distance from one another and thus to prevent the two parts from rubbing against one another.

3 Claims, 1 Drawing Sheet

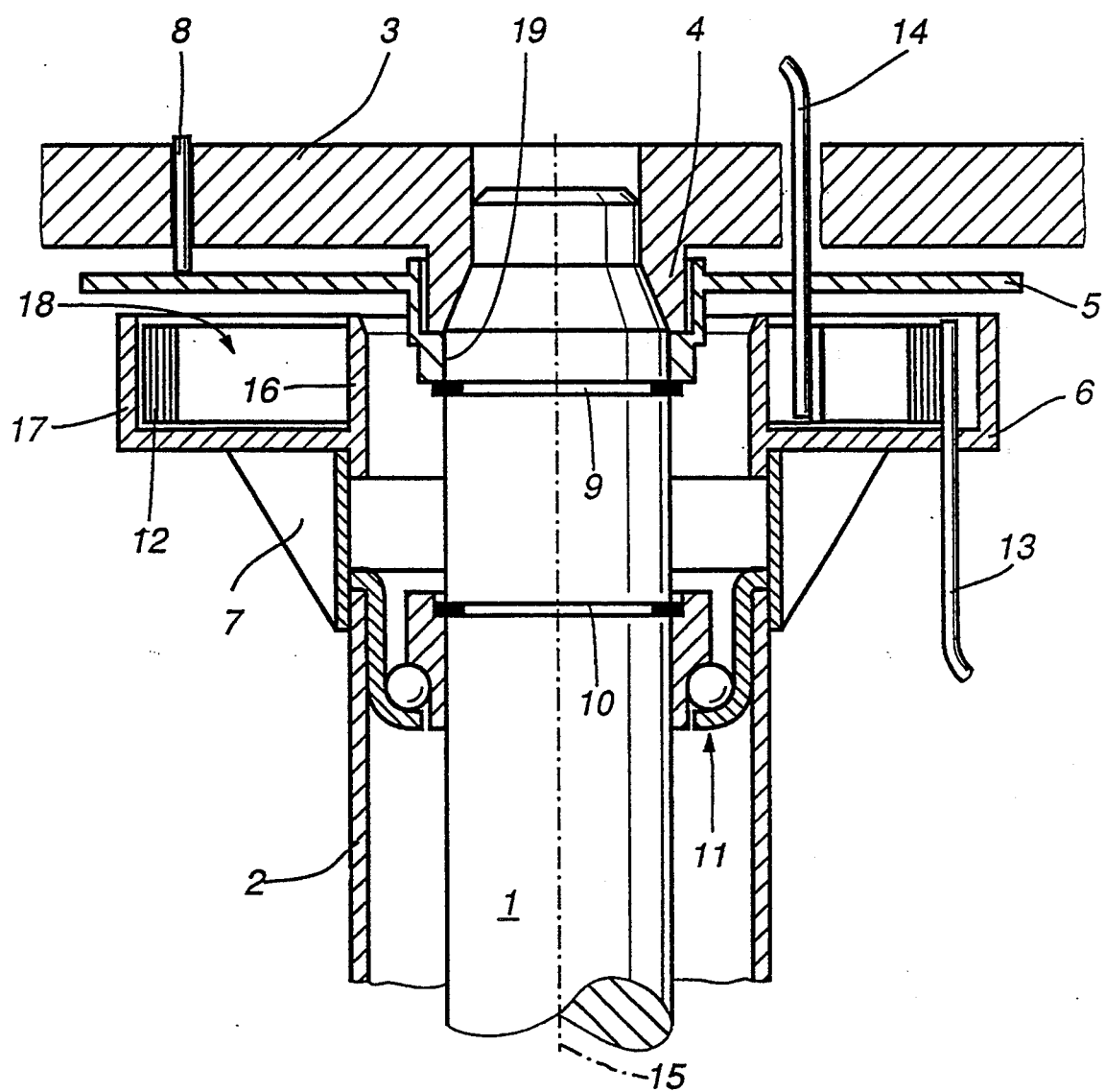

CASING FOR A SPIRAL CABLE

BACKGROUND AND SUMMARY OF THE INVENTION

The invention relates to a casing for a spiral cable for connecting electrical line terminals between a stationary steering column and a steering wheel shaft. The steering wheel shaft is rotatably mounted in the stationary steering column and equipped with a steering wheel for a motor vehicle. The casing comprises two coaxial casing parts, which can be rigidly connected, in the one case as stator to the fixed steering column and, in the other case, as rotor to the steering wheel shaft and which are so shaped that, when functionally associated with one another, they form a coaxial annular space for the spiral cable.

A casing of this kind is known from EP O 417 350 A1. The casing pan forming the stator has an annular configuration and contains an annular space which is radially open towards the center. This opening is closed by the second casing part serving as rotor and held rotatably in the stator. The annular casing part therefore turns, when functionally associated with the steering wheel, in the stationary outer casing part associated with the steering column.

An object underlying the invention is that of providing a casing for a spiral cable, of the type first defined above, in which the two casing parts, when functionally associated on the one hand with a rotatable steering wheel and on the other hand with a fixed steering column, can be turned relative to one another substantially without friction and therefore silently.

This object is achieved through the fact that one of the two casing pans has a recess which forms the annular space and which is open towards an axial face of the casing part, and that the other casing part is in the form of a plate and radially covers the annular space. It is thus possible for the one casing part to be disposed at an axial distance from the other casing part, because the two casing parts are separated from one another. As soon as the one casing part is rigidly connected to the rotatable steering wheel shaft and the other is fastened, coaxially to the axis of the steering wheel shaft, to the stationary steering column, the relationship of stator to rotor performs the function of bearing the steering wheel shaft. The two casing parts are therefore associated with one another on installation in the steering unit, without being in contact with one another. Frictional noise, which in the prior art is caused by the rotation of the rotor casing in the stator casing, is thereby avoided. Because of the lower moment of friction of the steering unit, the latter also acquires more favorable torque.

As a development of the invention, the casing part provided with the annular space can be rigidly connected to a steering column tube. This casing part thus serves as stator. Since in a motor vehicle steering unit the stator is usually situated below the steering wheel, it is advantageous to use the casing part containing the annular space as stator, because in this case the conductor strip of the spiral cable is always situated in the annular space because of its own weight. In the reverse arrangement it would be possible for the conductor strip to become jammed in the radial gap between the two casing parts.

As a further development of the invention the plate-like casing part can be fixed on a steering wheel hub and has an axially projecting centering pin which can be centered in a corresponding recess in the steering wheel. This constitutes a particularly simple functional connection of the casing part to the steering wheel and therefore to the steering wheel shaft, because the casing part has only to be fixed to the steering wheel, so that, when the steering wheel is subsequently fastened on the steering wheel shaft, it will automatically be disposed concentrically to the steering wheel shaft.

Other objects, advantages and novel features of the present invention will become apparent from the following detailed description of the invention when considered in conjunction with the accompanying drawings.

BRIEF DESCRIPTION OF THE DRAWINGS

The single drawing figure shows a section of a spiral cable arranged between a rotatable steering wheel and a stationary steering column, the casing of the spiral cable consisting of two casing parts disposed at a short axial distance one above the other, constructed according to a preferred embodiment of the invention.

DETAILED DESCRIPTION OF THE INVENTION

A spiral cable according to the drawing serves to connect an electrical line terminal (13) of the stationary steering column to an electrical line terminal (14) in the steering wheel (3). The electrical line terminal (14) of the steering wheel (3) leads to electrical devices disposed in the steering wheel (3), such as for example the contact button for the horn of the motor vehicle or for the firing device of an airbag disposed in the impact absorber on the steering wheel. For the connection of these line terminals (13, 14) the spiral cable has an insulated electrical conductor strip which is wound spirally around the axis (15) of the steering wheel shaft. The spiral cable is disposed in a casing comprising two casing parts (5, 6), in each of which a line terminal (13, 14) is disposed. The casing part (5) is fixed on the steering wheel (3) in a manner to be described further on and therefore serves as rotor, while the casing part (6) is rigidly connected by means of a holder (7) to a stationary steering column tube (2) and therefore serves as stator. The two casing parts (5) and (6) are made of plastics material.

A steering wheel shaft (1) is mounted so as to be capable of rotating about a steering wheel shaft axis (15) in the stationary steering column tube (2) by means of a steering wheel shaft bearing (11) disposed on the end face of the steering column tube (2). The steering wheel shaft (1) is secured axially by a circlip (10) in the steering wheel shaft bearing (11). The steering wheel (3) is mounted on the free, conically stepped end of the steering wheel shaft (1). For this purpose the steering wheel (3) has a flange-like hub (4), the face of which lies against a circlip (9) of the steering wheel shaft (1), with the interposition of the casing part (5). The casing pan (5) is substantially in the form of an annular plate and, similarly to the steering wheel (3), has a flange-like hub (19) by means of which the casing part (5) is centered and fixed on the hub (4) of the steering wheel (3). The casing pan (5) is thus also disposed coaxially to the steering wheel shaft (1). From the top face of the casing pan (5), facing the steering wheel (3), a centering pin (8) projects vertically and can be centered in a corresponding opening in the steering wheel (3), thus assisting the driving of the casing part (5) by the steering wheel (3) when the latter is turned.

A holder (7) is fixed at the top end of the steering column tube (2). The holder (7) has a cylindrical inner contour, by which it is pressed or welded onto the steering column tube (2). The casing part (6) is mounted on the holder (7) with the aid of flange-like centering means, which are adapted to the cylindrical inner contour of the holder (7), and is rigidly joined to the latter, for example by screwing. The casing part (6) has an annular space (18) holding the spiral cable (12). The annular space (18) is formed by a cylindrical inner wall (16) of the casing part (6) and by a cylindrical outer wall (17) spaced radially apart therefrom. In their mounted state shown in the drawing the two casing parts (5) and (6) are arranged at a short axial distance from each other, so that the casing parts (5) and (6) do not come into contact with one another when the steering wheel (3) is turned. The casing part (5) projects radially beyond the casing part (6).

In another embodiment the casing part forming the rotor has the shape of the casing part (6) bounding the annular space, and the casing part forming the stator is in the form of a plate, corresponding to the casing part (5). Otherwise the arrangement corresponds to the embodiment shown in the drawing.

Other advantages and features of the invention will be seen in the subclaims and in the following description of one example of embodiment, which is illustrated in the drawings.

What is claimed

1. Casing arrangement for holding an electrical spiral cable which connects electrical line terminals at a stationary steering column and a steering wheel carried on a steering wheel shaft rotatably mounted in the steering column, said casing arrangement comprising:

a first casing part rigidly connectible to the steering column, and a second casing part rigidly connectible to the steering wheel shaft, wherein one of said first and second casing parts defines an annular space coaxial with the steering column and steering wheel shaft for accommodating the entire spiral cable, and wherein the other of said first and second casing parts is located entirely outside of the annular space and includes a substantially flat plate which in its installed condition covers the entire annular space in its axial direction and is located at an axial spacing from the annular space.

2. Casing arrangement according to claim 1, wherein the first casing part defines the annular space, and wherein the second casing part includes the flat plate.

3. Casing arrangement according to claim 2, comprising a centering pin projecting from the flat plate into an opening in the steering wheel to thereby assist transfer of steering forces between the steering wheel and flat plate.

* * * * *